(12) United States Patent
Gundecha et al.

(10) Patent No.: US 6,732,174 B1
(45) Date of Patent: May 4, 2004

(54) APPARATUS AND METHOD OF ESTABLISHING A CALL USING WIRELESS AND WIRELINE INTEGRATION THROUGH A TELECOMMUNICATION SWITCH

(75) Inventors: Chandrakant Gundecha, Raleigh, NC (US); William David Gentry, Cary, NC (US); Roy Emery Hanzel, Apex, NC (US); C. Michael Brown, Raleigh, NC (US); Sanjay Bhatia, Raleigh, NC (US); David Anthony Gallagher, Fuquay-Varina, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/072,828

(22) Filed: May 5, 1998

Related U.S. Application Data (60) Provisional application No. 60/045,727, filed on May 6, 1997.

(51) Int. Cl.[7] ................................................. G06F 13/00
(52) U.S. Cl. .................. 709/227; 709/313; 379/220.01; 379/229
(58) Field of Search ................................. 709/217, 219, 709/227, 228, 237, 238, 249, 311, 313, 318, 329; 379/219, 220.01, 229, 230, 231, 242, 252

(56) References Cited

U.S. PATENT DOCUMENTS

| 5,463,623 | A | * | 10/1995 | Grimes et al. ................. 370/79 |
| 6,011,975 | A | * | 1/2000 | Emery et al. ................ 455/456 |
| 6,091,808 | A | * | 7/2000 | Wood et al. ................. 379/201 |
| 6,181,935 | B1 | * | 1/2001 | Gossman et al. ........... 455/433 |

\* cited by examiner

*Primary Examiner*—Viet D. Vu
(74) *Attorney, Agent, or Firm*—John R. Witcher; Kevin Sembrat (57) ABSTRACT

An integrated wireless and wireline telecommunication switch. The switch includes peripheral modules having both wireless and wireline peripheral devices. The switch also includes wireless and wireline software load. An aspect table allows the wireless and wireline software load within the switch to be executed within a single call without creating direct dependencies on each other. The switch allows new and more efficient connections between wireless and wireline subscribers. In many cases wireless and wireline subscribers having direct access to the switch can connect without using any other switches in the network.

8 Claims, 11 Drawing Sheets

APPARATUS AND METHOD OF ESTABLISHING A CALL USING WIRELESS AND WIRELINE INTEGRATION THROUGH A TELECOMMUNICATION SWITCH

CROSS-REFERENCE TO RELATED APPLICATION

This application is related to and claims priority from provisional patent application serial No. 60/045,727, filed May 6, 1997, the entire disclosure of which is incorporated herein by reference.

BACKGROUND

1. Field of the Invention

This invention is related to the field of telecommunication switching. In particular, this invention is related to the integration of wireless telecommunication switching and wireline telecommunication switching within a single switch.

2. Description of the Problem Solved

Presently, telecommunication switching has evolved on separate paths. Wireline switching, or conventional telephony switching has evolved over the last century with a very well-developed set of protocols, standards, and network topologies. Wireless switching, much newer, has evolved with yet a different set of protocols, standards, and network topologies. Some of the differences between wireless and wireline switching are unavoidable given the different communication media involved in the different technologies. However, the differences in the two systems have largely resulted in disparate systems for switching wireless calls and wireline calls throughout the public telecommunication network.

The public wireless network and the public wireline network obviously must connect together at various points. Wireless subscribers and wireline subscribers need to be able to communicate with each other. In the current art, this intercommunication between the two types of networks is accomplished through specialized complexes of hardware. Such a hardware complex includes a wireline telecommunication switch and a wireless telecommunication switch together with specialized hardware to tie the two together. The problem with these hardware complexes is that they require a great deal of space, power, and maintenance. Additionally, software resources and processing resources are wasted because the wireline and wireless switches have many elements in common.

Figure 1:
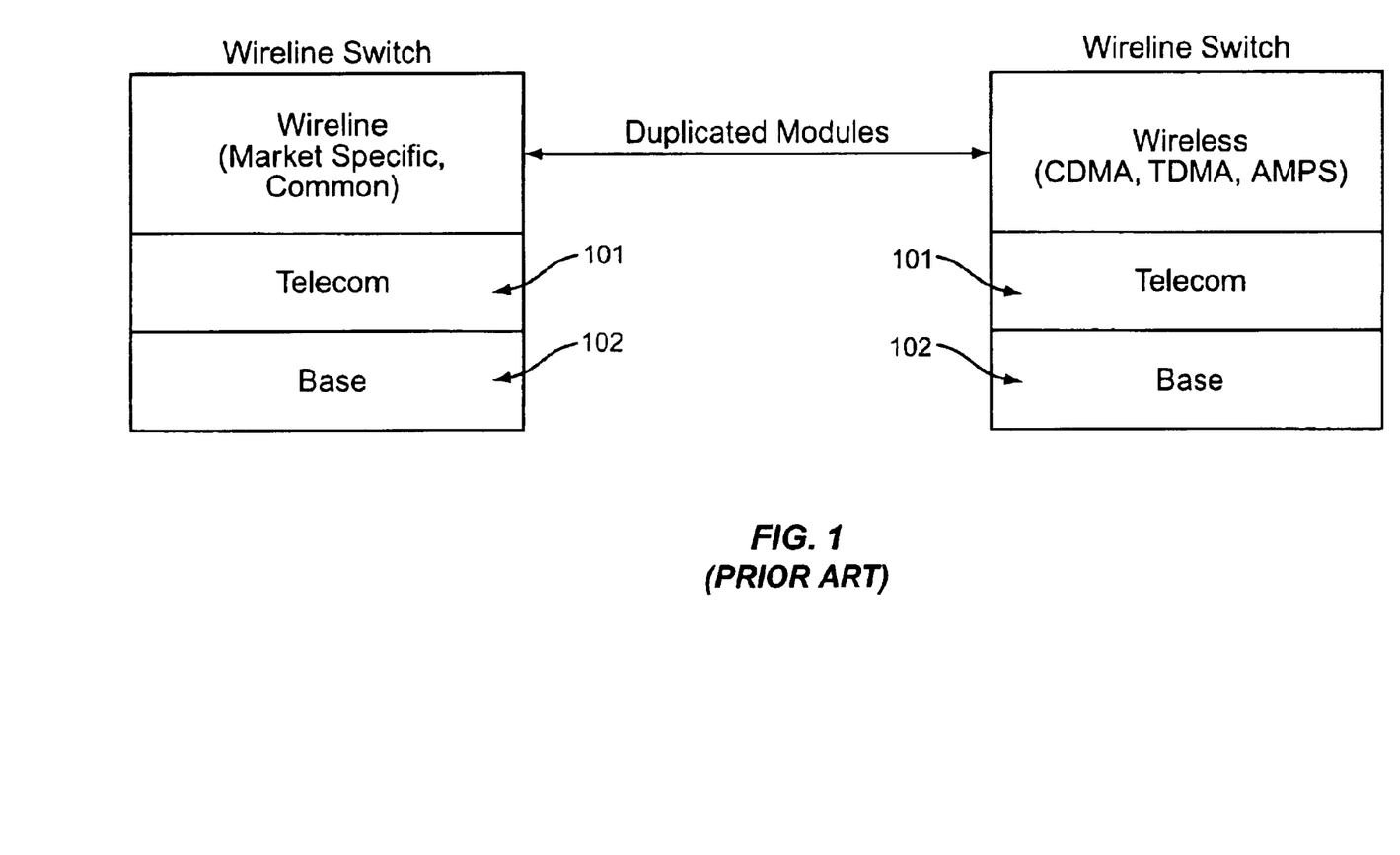
FIG. 1 shows a comparison of the software stacks of prior art wireline and wireless switches.

FIG. 1 shows conceptual software stacks for a wireline switch and a wireless switch. Notice that the telecom software module 101 and the base software module 102 is duplicated in the two switches. What is needed is a way to use the same telecom software module and base software module for both wireline and wireless telecommunication within a single integrated telecommunication switch. Such a scheme would eliminate much of the redundant hardware and software involved in achieving wireless and wireline functionality at the same switching point in a network. In order to accomplish this integration, a way must be devised to allow the wireless and wireline software modules to share the telecom software module and the base software module without creating any dependencies on each other.

SUMMARY

The present invention solves the aforementioned problems by providing an integrated wireless and wireline telecommunication switch. The integrated switch operates with both wireless and wireline networks to provide direct communication between the two. The integrated switch of the present invention greatly reduces space, power consumption, and complexity of switching centers which provide communication between wireless and wireline telecommunication networks. The integrated switch also makes it possible for some wireless and wireline subscribers to be connected without using any other switches in the network.

The integrated switch of the present invention includes hardware and software to implement both wireless and wireline telecommunication switching functions. The software which operates the integrated switch is an integrated wireless and wireline software load which includes a shared base software layer and a shared telecom software layer which communicate with each other and other layers. The software includes both a wireless software layer and a wireline software layer. Special software modules called aspect tables which contain one or more software gate structures of procedure variables allow the wireless and wireline software loads within the switch to be executed within a single call without creating direct dependencies on each other. The wireless and wireline software loads can bind procedures into the aspect tables. The aspect tables of the present invention can reside either within the shared telecom software layer or within a shared common software library.

The integrated switch which implements the present invention includes a switching matrix, an input/output module, and a processor core which includes processing elements and memory. In addition, the switch includes both a wireline peripheral module and a wireless peripheral module, both connected to the switching matrix. The wireline peripheral module includes peripheral devices for interfacing the switch to the wireline network. The wireless peripheral module includes peripheral devices for interfacing the switch to the wireless network. The processor core together with software which implements the present invention provides a means for performing the various functions required to switch calls through and between the wireless and wireline networks.

The integrated switch of the present invention is connected to a public switched telephone network (PSTN) and a base station controller (BSC) which includes connections for one or more base transceiver stations (BTS). In the preferred embodiment, the switch is also connected to signal transfer points (STP's) having access to service control point (SCP) databases. The STP's and SCP's allow the switch to communicate with an advanced intelligent network (AIN) or wireless intelligent network (WIN). Integrated signaling links can be used to communicate IS-41, transaction capabilities application part (TCAP), and signaling system 7 (SS7) messages needed for call processing, services, AIN and WIN.

The integrated switch of the present invention allows new and more efficient functionality when switching calls between wireless and wireline subscribers. This new functionality is especially evident when calls are switched between wireless and wireline subscribers where both are served by the same switch. In this case, the subscribers do not need to have their calls routed through any other switches. When such a wireless subscriber calls the wireline subscriber the switch receives an origination message from the wireless subscriber, sends a set-up request to the wireline subscriber, sends an alerting message to the wireless subscriber, completes the connection to the wireline subscriber, and then completes a complete telecommunication signal path between the wireless and wireline subscribers. Only the integrated switch of the present invention is needed to complete the path. If such a wireline subscriber wishes to call a wireless subscriber, the integrated switch determines a location for the wireless subscriber through a request to a home location register. The switch then pages the wireless subscriber and completes the connection. Again, only the integrated switch is required to complete the connection. The integrated switch of the present invention can also complete simultaneous wireline and wireless calls through an integrated trunk which is connected to a wireline end-office.

The software which implements many aspects of the present invention can be stored on a media. The media can be magnetic such as diskette, tape or fixed disk, or optical such as a CD-ROM. Additionally, the software can be supplied via the Internet or some type of private data network. The input output module of the integrated switch includes input/output devices which can read storage media containing the software.

DETAILED DESCRIPTION OF THE PREFERRED EMBODIMENT

Figure 2:
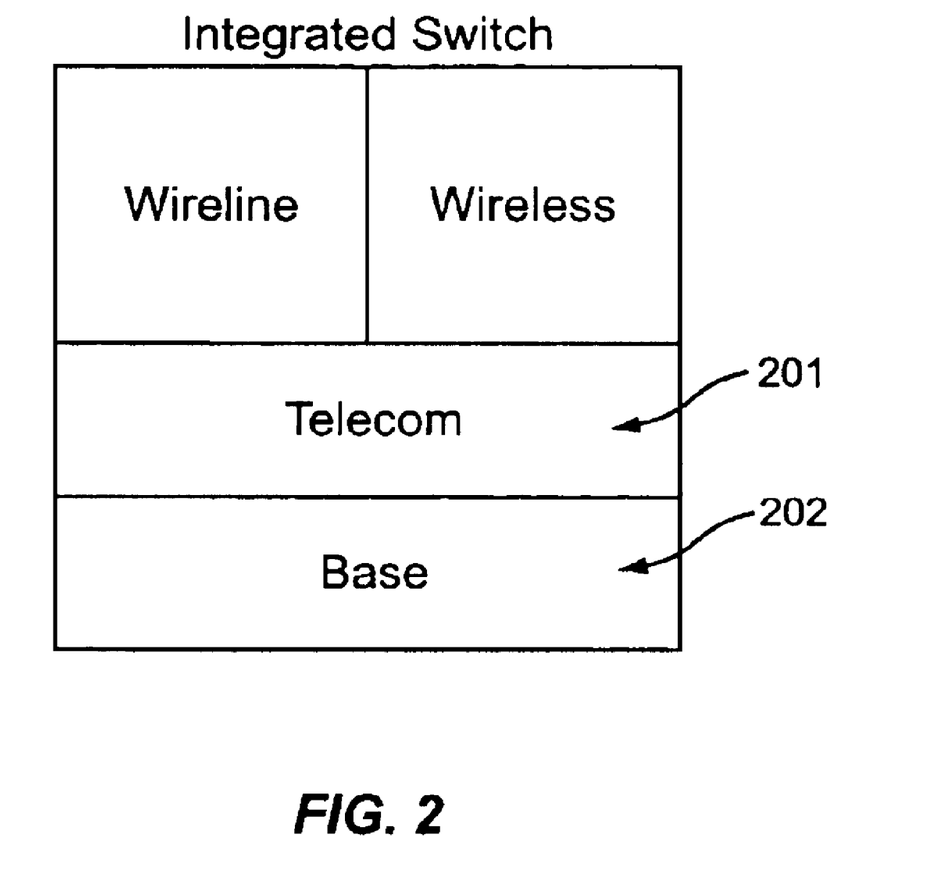
FIG. 2 is a conceptual diagram illustrating the software stacks of the integrated telecommunication switch of the present invention.

FIG. 2 is a conceptual diagram that illustrates the software stacks of the integrated telecommunication switch of the present invention. Common telecom software layer 201 and common base software layer 202 are shared by wireline and wireless software which reside together in the integrated switch. The base software layer includes a computer operating system and non-switching specific software. The non-switching specific software includes schedulers, exception processors, and similar software modules.

Figure 3:
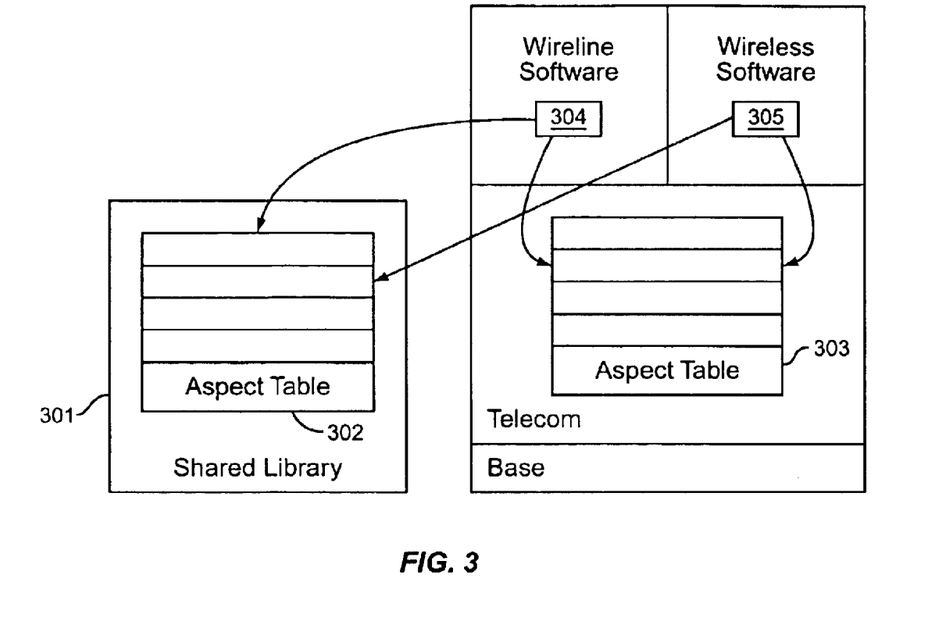
FIG. 3 illustrates an aspect table according to the present invention and shows where it can reside.

FIG. 3 illustrates an aspect table according to the present invention which contains a gate structure of procedure variables. The aspect table can reside within the telecom software layer as shown at 303, or within a shared software library 301, as shown at 302. Integrated wireline and wireless software loads can be executed within the same call without creating any direct dependencies on each other. Wireline software procedure 304 and wireless software procedure 305 are bound into the aspect table.

Figure 4:
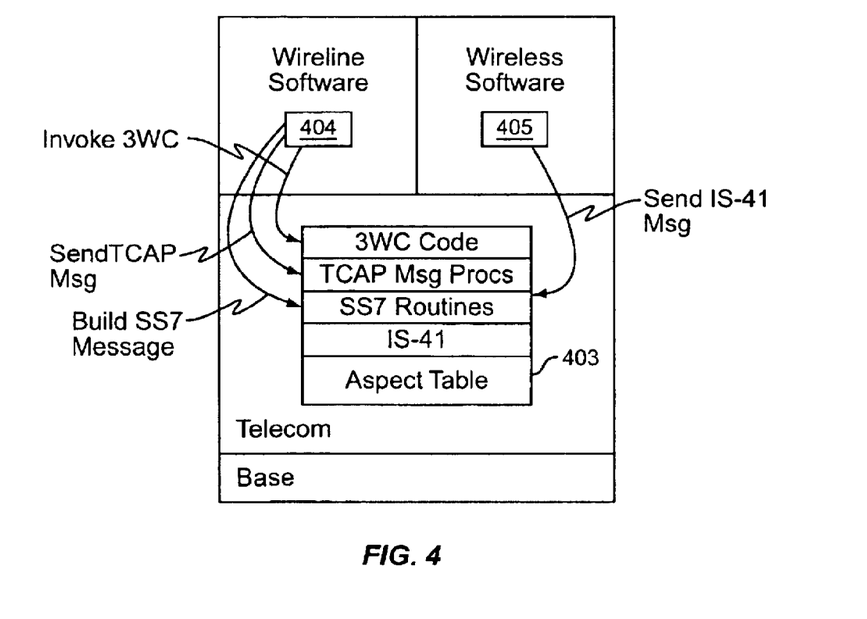
FIG. 4 illustrates an example of an aspect table residing within the telecom base layer software of the integrated switch of the present invention.

FIG. 4 is a more specific example of how aspect tables are used to implement the integrated switch. The aspect tables allow services to be shared by wireless and wireline subscribers. In FIG. 4, wireline software procedure 404, and wireless software procedure 405 can each access aspect table 403. In this example, the aspect table 403 resides within the shared telecom software layer. Some examples of functionality which is shared by the wireless and wireline subscribers to the integrated switch include call processing services (three-way calling or "3WC" is shown), message signaling infrastructure (TCAP and IS-41 are shown) and PSTN trunk signaling routines (SS7 is shown). The aspect table infrastructure is flexible and can be extended to share other call processing and switch maintenance capabilities between wireless and wireline subscribers.

Figure 5:
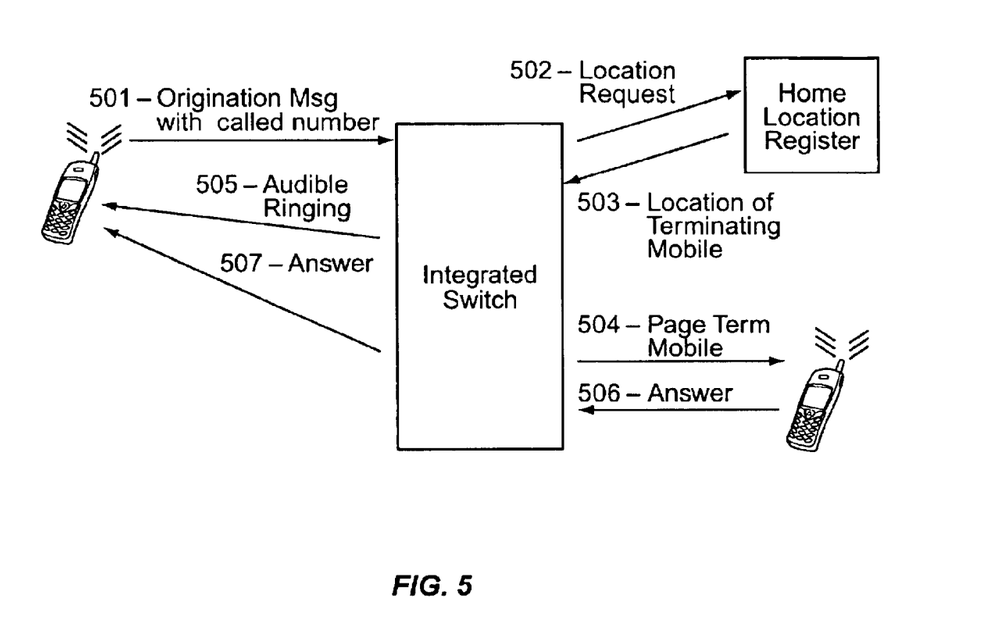
FIG. 5 is a message sequence diagram showing two wireless subscribers making a connection through the integrated switch of the present invention.

FIG. 5 illustrates a wireless subscriber to wireless subscriber call which is processed by the integrated switch of the present invention. First, an origination message is received from the originating wireless subscriber at 501. This origination message includes the number which was dialed by the originating user. The integrated switch authenticates the originating wireless subscriber, translates the called number, and routes the call to the terminating wireless subscriber. Location request query 502 is launched to the home location register to determine where the terminating wireless subscriber is currently located. A response 503 is received which indicates that the terminating wireless subscriber is served by the same switch. The terminating wireless subscriber is paged at 504 and audible ringing is supplied to the originating wireless subscriber at 505. When the terminating wireless subscriber answers the page at 506 a telecommunication signal path is connected between the originating wireless subscriber and the terminating wireless subscriber at 507. The call stays in place until either of the two wireless subscribers disconnects or a hard hand-off occurs. When one subscriber disconnects, the connection will be taken down, and the call is cleared.

The home location register as referred to above is a permanent database which stores wireless subscriber's profiles. In the preferred embodiment, the integrated switch supports home location registers internal to the switch, however, the home location register can also be located external to the switch. The integrated switch can also include a visitor location register. The visitor location register maintains a local database which stores information required to handle calls to and from wireless subscribers in the local area served by the integrated telecommunication switch. The subscriber information for the visitor location register is retrieved from the home location register and stored in the visitor location register when a wireless subscriber activates their mobile phone in an area being served by a particular integrated switch.

Figure 6:
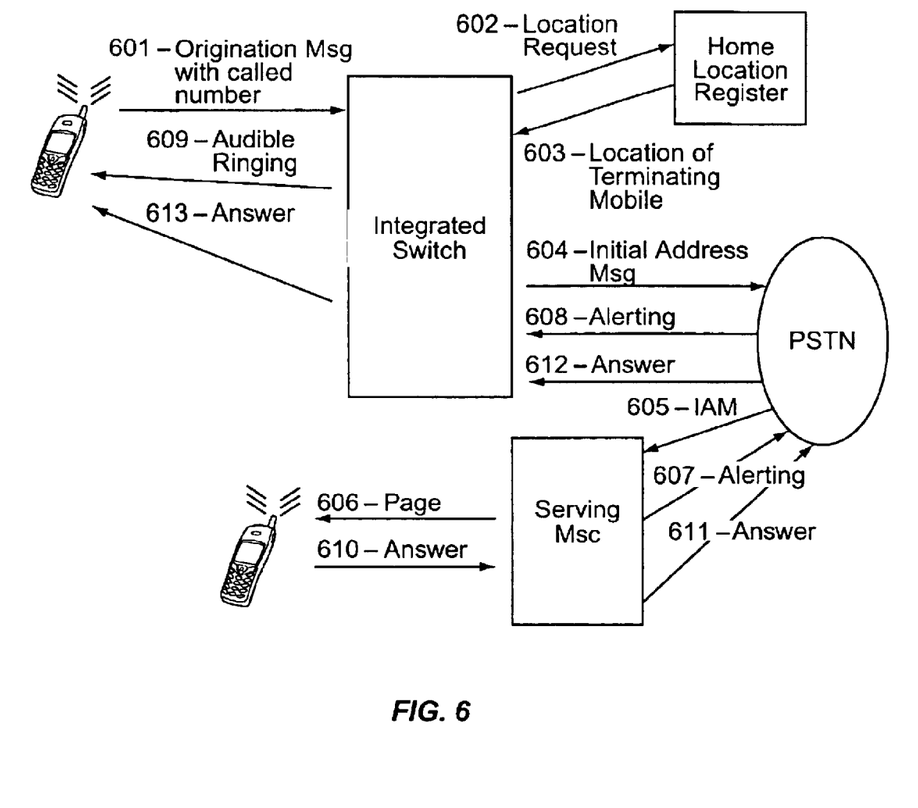
FIG. 6 is a message sequence diagram showing two wireless subscribers making a connection using both the PSTN and the integrated switch of the present invention.

FIG. 6 illustrates a wireless subscriber to wireless subscriber call where the terminating subscriber is served by a switch other than the integrated switch of the present invention. An origination message 601 is received from the originating subscriber. This message includes the number which is supplied by the originating user. The integrated telecommunications switch authenticates the originating subscriber, translates the called number, and routes the call to the terminating subscriber. A location request query 602 is launched to the home location register to determine where the terminating subscriber is currently located. A response 603 is received which indicates that the terminating subscriber is served by different switch in the network. An initial address messages is formulated and sent into the public switched telephone network (PSTN) at 604 using integrated SS7 messaging and integrated trunking. The initial address message (IAM) is delivered by the PSTN to the serving mobile switching center (MSC) at 605. The terminating subscriber is paged at 606. An alerting message 607 is sent through the PSTN to the originating integrated telecommunications switch at 608, which sends an audible ringing message 609 to the terminating subscriber. When the terminating subscriber answers at 610 an answer message 611 is sent through the PSTN to the originating integrated telecommunications switch at 612. A telecommunication signal path is connected between the originating subscriber and terminating subscriber at 613. Again, the call will stay in place until either of the two parties disconnects.

Figure 7:
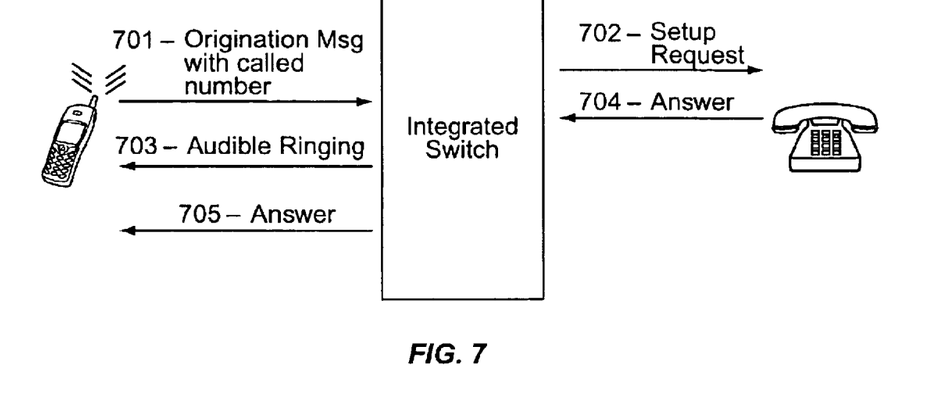
FIG. 7 is a message sequence diagram showing a wireless subscriber making a connection through the integrated switch of the present invention to a wireline subscriber.

FIG. 7 illustrates a call between an originating wireless subscriber and a wireline subscriber, each of whom have a direct signal path to the integrated wireless and wireline telecommunication switch of the present invention. In this case, the integrated telecommunication switch of the present invention can handle the entire call. At 701 the switch receives an origination message from the originating wireless subscriber. This message includes the number which was supplied by the user. The integrated switch authenticates the originating subscriber, translates the called number, and routes the call to the terminating wireline subscriber. The message routed to the terminating wireline subscriber is specific to the type of line in use. The types of lines which can be used are well-known in the art and are not shown for the sake simplicity. However, these types include an integrated services digital network (ISDN) basic rate interface (BRI), attendant console, POTS, and others. A set-up request 702 is sent to the terminating wireline subscriber. This request initiates an altering message for the terminating subscriber. An audible ringing indication 703 is then sent to the originating wireless subscriber. When the terminating wireline subscriber answers at 704, a telecommunication signal path is connected between the originating wireless subscriber at 705 and the terminating wireline subscriber. The call stays in place until either of the two parties disconnects.

It should be noted that throughout this disclosure we have referred to messages being sent to or received from devices and/or hardware associated with a subscribed user as messages being sent to or received from the subscriber. The types of equipment and hardware used by wireless and wireline users both at the customer premises equipment (CPE) and at other points in the terminating loop are well-known in the art and have been omitted for simplicity.

Figure 8:
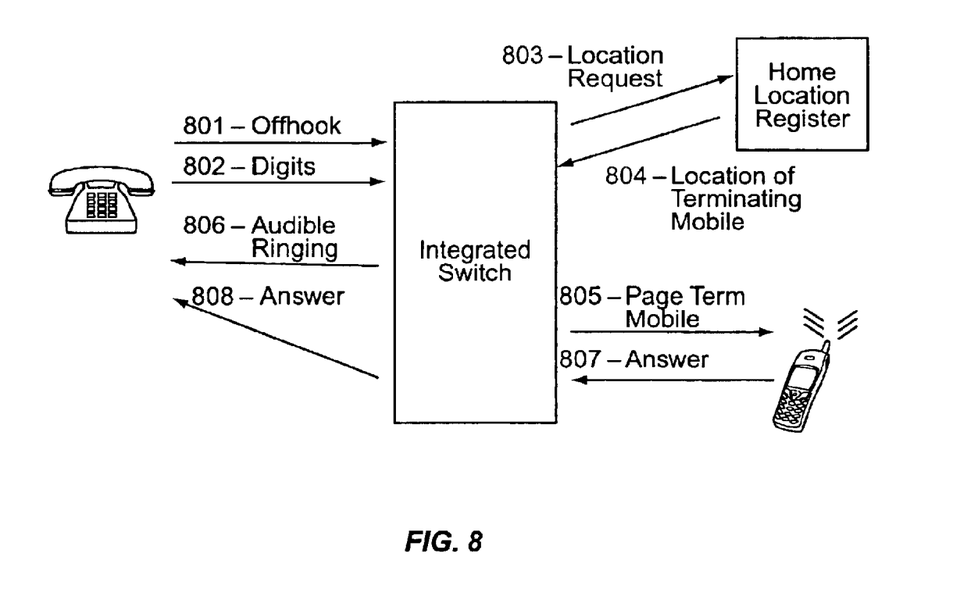
FIG. 8 is a message sequence diagram showing a wireline subscriber making a connection through the integrated switch of the present invention to a wireless subscriber.

FIG. 8 illustrates a connection between an originating wireline subscriber and a terminating wireless subscriber, both of whom have direct signal paths to the integrated switch. Again, in this case, the integrated wireless and wireline telecommunication switch of the present invention can handle the entire call. An off-hook indication is received at 801 from the originating wireline subscriber. Again, the messaging is specific to the type of line and is not shown for the sake of simplicity. The digits of the called number are collected from the originating wireline subscriber at 802. The integrated switch of the present invention translates the called number and routes the call to the terminating wireless subscriber. Location request query 803 is launched to the home location register to determine where the wireless subscriber is currently located. A response 804 is received which indicates that the wireless subscriber is served by the integrated switch. The terminating wireless subscriber is paged at 805, and audible ringing is supplied for the originating wireline subscriber at 806. When the terminating wireless subscriber answers the page at 807 a telecommunication signal path is connected between the originating wireline subscriber at 808 and the terminating wireless subscriber. Again, the call stays in place until either of the two parties disconnects.

Figure 9:
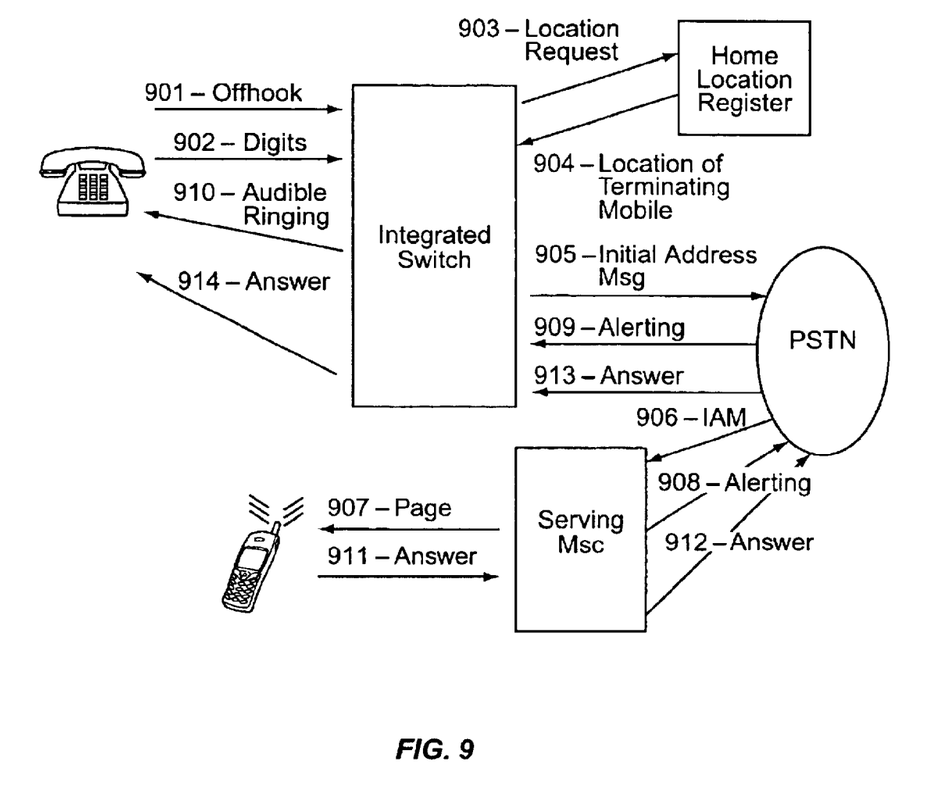
FIG. 9 is a message sequence diagram showing a wireline and wireless subscriber making a connection through the integrated switch of the present invention and the PSTN.

FIG. 9 illustrates a wireline subscriber to wireless subscriber call where the terminating subscriber is served by a switch other than the integrated switch of the present invention. An off-hook indication 901 is received from the originating wireline subscriber. The digits of the called number are collected from the originating wireline subscriber at 902. The integrated switch of the present invention translates the called number and routes the call to the terminating wireless subscriber. Location request query 903 is launched to the home location register to determine where the wireless subscriber is currently located. The response 904 is received which indicates that the wireless subscriber is served by different switch in the network. An initial address message (IAM) 905 is formulated and sent into the PSTN using SS7 or integrated trunking. The IAM is delivered by the PSTN to the MSC at 906. The terminating wireless subscriber is paged in 907. An alerting message 908 is sent through the PSTN to the originating, integrated switch at 909. The originating, integrated switch applies audible ringing to the originating wireline subscriber equipment at 910. When the terminating, wireless subscriber answers the page at 911, an answer message 912 a sent through the PSTN and then to the integrated switch at 913. A telecommunication signal path is established between the originating wireline subscriber and terminating wireless subscriber at 914. The call will stay in place until either of the two parties disconnects.

Figure 10:
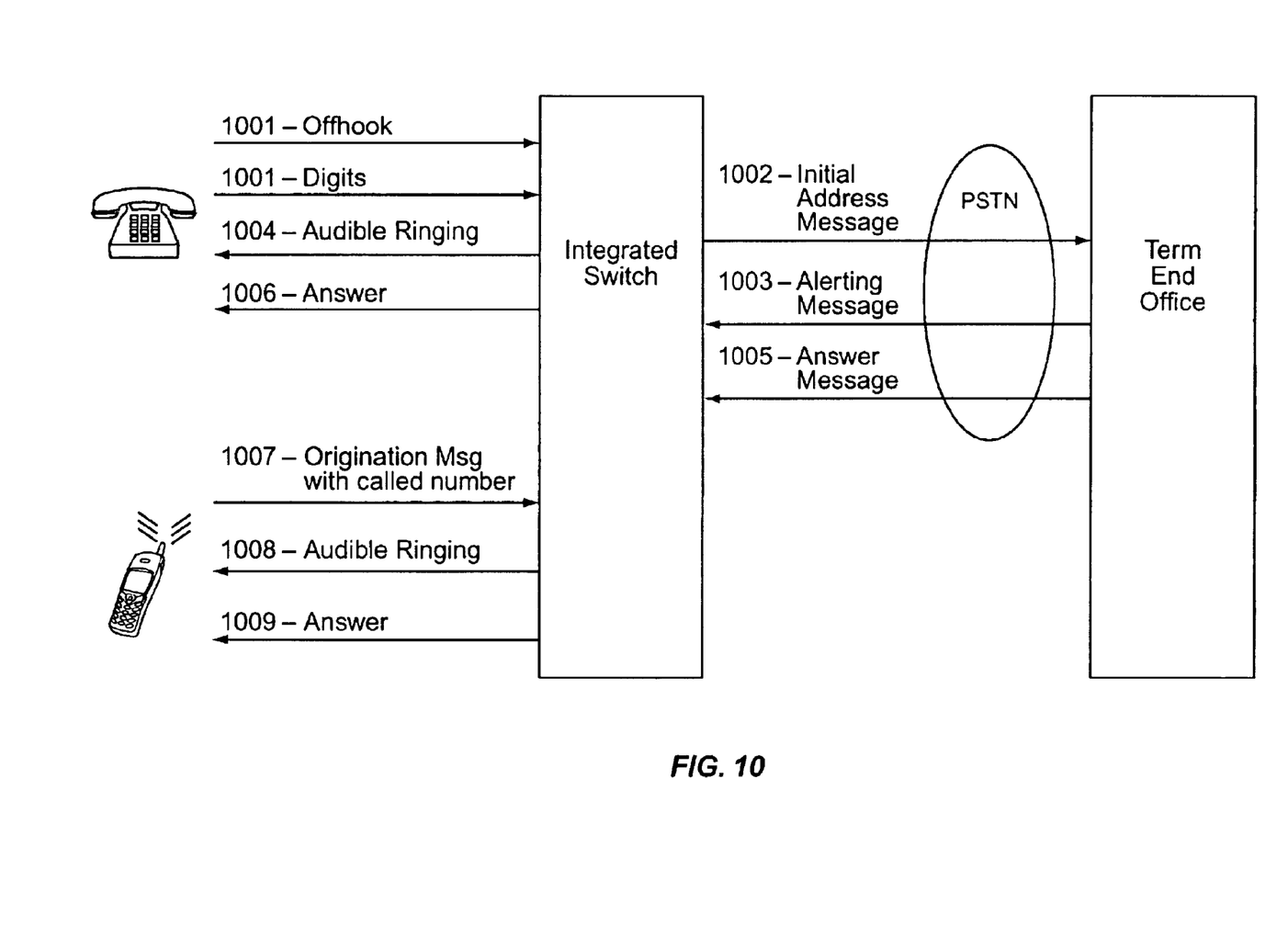
FIG. 10 is a message sequence diagram showing wireless and wireline subscribers making simultaneous connections through the integrated switch of the present invention and an integrated PSTN trunk.

FIG. 10 is a message sequence chart showing how the integrated telecommunication switch of the present invention can complete simultaneous wireline and wireless calls through a PSTN integrated trunk, such as an integrated services digital network user part (ISUP) trunk. When a wireline call is initiated at the integrated switch, the switch receives an off-hook notification and the called number digits at 1001. The switch then sends an initial address message 1002 through the integrated trunk to a terminating end office. An alerting message 1003 is received back from the terminating end office. The integrated switch sends an audible ringing signal 1004 to the originating wireline subscriber. When the switch receives an answer message at 1005 over the integrated PSTN trunk, it communicates the answer back to the wireline subscriber at 1006 and a first telecommunication signal path is connected.

The integrated telecommunication switch can then connect a call originated by a wireless subscriber in a similar fashion, receiving an origination message at 1007 and sending in audible ringing message at 1008. At 1009 when the terminating subscriber answers, the call is connected. A second telecommunication signal path is then operating. The integrated wireless and wireline telecommunication switch can maintain both the wireless and wireless calls through the integrated PSTN trunk without having to have separate wireless and wireline switches operating at the near end of the PSTN trunk. A near-end office using the integrated switch of the present invention therefore uses less space and resources than a near-end office containing both wireless and wireline switches.

Figure 11:
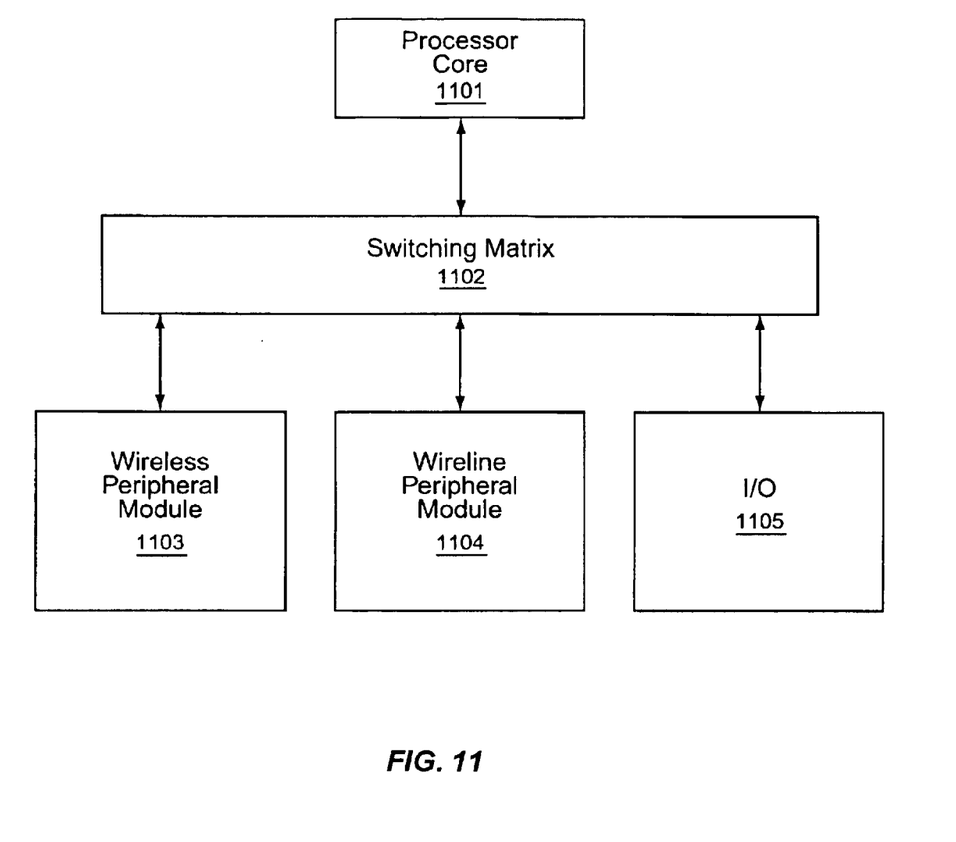
FIG. 11 is a functional hardware block diagram of an integrated switch according to the present invention.

FIG. 11 shows a functional block diagram of the integrated wireless and wireline telecommunication switch of the present invention. Processor core 1101 includes a central processing unit, memory, and supporting circuitry. This processor core, together with any computer program code stored in memory is the means for controlling the overall operation of the switch. Switching matrix 1102 allows the processing core to communicate with the other switch components. The switching matrix 1102 includes one or more buses and accompanying internal networking circuitry. In the preferred embodiment the internal networking circuitry includes enhanced networking (ENET) circuitry. Alternatively, the internal networking circuitry can include junction networking (JNET) circuitry. Input/output (I/O) module 1105 is also connected to the switching matrix and includes removable media devices to load computer program code into the switch. The I/O module also includes devices for connection to workstations and similar equipment.

The wireless peripheral module 1103 is connected to the switching matrix 1102 and is managed by the processor core 1101. The wireless peripheral module 1103 includes numerous components with their own processors which allow the integrated switch to interface to a wireless network. In the preferred embodiment, the wireless peripheral module also includes devices which communicate with an advanced intelligent network (AIN) and other data networks. However, these devices can alternatively be included in the wireline peripheral module 1104, discussed below, or in the processor core. In the preferred embodiment, the wireless peripheral module includes interface units and application units to connect directly to a base station controller for the particular type of wireless network with which the integrated switch is used, for example, a code division multiple access (CDMA) network. The wireless peripheral module includes a link peripheral processor which controls the operation of the various interface units. The wireless peripheral module 1103 is the means by which messages are sent to and received from a wireless network.

The wireline peripheral module 1104 provides an interface to a wireline network including various types of line interfaces, as well as trunk interfaces into the public switched telephone network (PSTN). The wireline peripheral module includes digital trunk controllers, line concentrating devices, line group controllers, line trunk controllers, and possibly also data networking interface devices. In the preferred embodiment, an extended peripheral module (XPM) controls the operation of the wireline peripheral module. Wireline peripheral module 1104 is a means by which messages are sent to and received from a wireline network.

Figure 12:
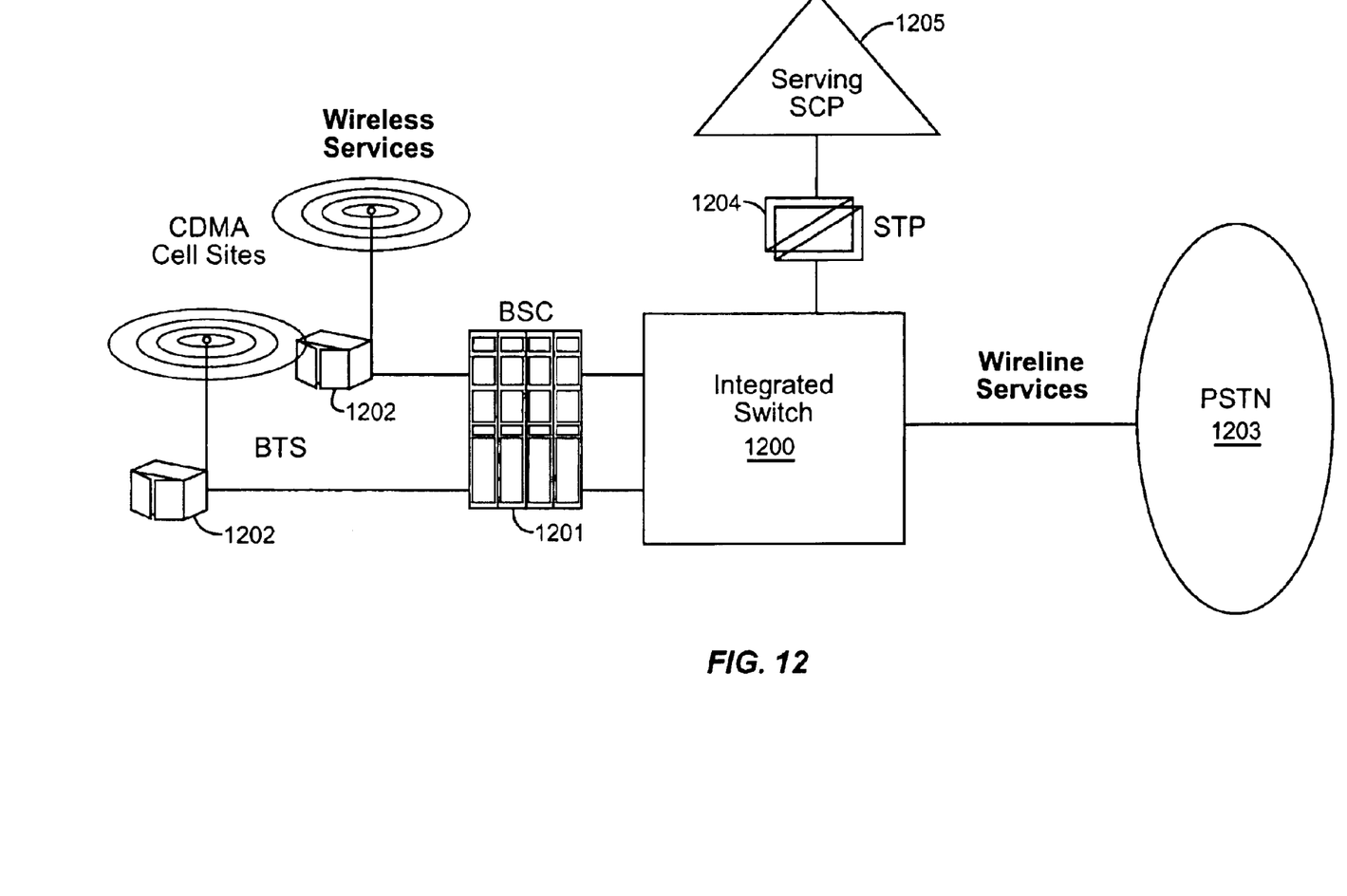
FIG. 12 is a network diagram illustrating the operating environment of the integrated switch of the present invention.

FIG. 12 is a high-level network diagram which illustrates the operating environment of the integrated wireless and wireline telecommunication switch of the present invention. The wireless network of FIG. 12 includes a base station controller (BSC) 1201 and base transceiver stations (BTS) 1202, which together provide wireless services. PSTN 1203 is the wireline network connected to the integrated switch to provide wireline services. The integrated switch 1200 of the present invention is disposed between the wireless network and wireline network, and provides both wireless and wireline services. Advanced intelligent network (AIN), wireless intelligent network (WIN), or SS7 components include a signal transfer point (STP) 1204 and its serving service control point (SCP) 1205.

Figure 13:
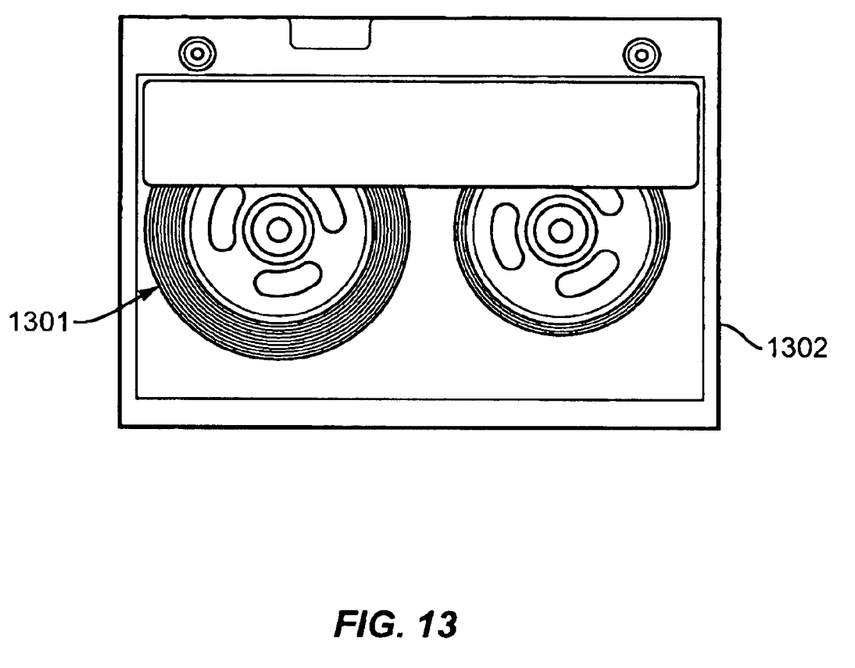
FIG. 13 is diagram illustrating a media containing the software which implements many aspects of the present invention.

As previously mentioned, appropriate computer program code in combination with hardware implements many of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation over some type of data network. FIG. 13 illustrates one example of a media. FIG. 13 shows a tape cartridge of the type where magnetic media 1301 is enclosed in a protective cassette 1302. Magnetic field changes over the surface of the magnetic media 1301 are used to encode the computer program code. In this way the computer program code is stored for transport and later retrieval.

We have described specific embodiments of our invention which provides an integrated wireless and wireline telecommunication switch. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. In an integrated wireless and wireline telecommunication switch, a method of establishing a call between wireless and wireline subscribers through the switch wherein both subscribers are served by the switch, the method comprising the steps of:

receiving an origination message from the wireless subscriber;

sending a set-up request to the wireline subscriber;

sending an alerting message to the wireless subscriber;

completing a connection to the wireline subscriber when the wireline subscriber answers; and completing a telecommunication signal path between the wireless and wireline subscribers wherein the telecommunication signal path between the wireless and wireline subscribers is switched only by the integrated wireless and wireline telecommunication switch.

2. In an integrated wireless and wireline telecommunication switch, a method of establishing a call between wireline and wireless subscribers through the switch wherein both subscribers are served by the switch, the method comprising the steps of:

receiving and off-hook notification message from the wireline subscriber;

receiving called number digits from the wireline subscriber;

determining a location for the wireless subscriber through a request to a home location register;

paging the wireless subscriber;

sending an alerting message to the wireline subscriber;

completing a connection to the wireless subscriber when the wireless subscriber answers; and completing a telecommunication signal path between the wireline and wireless subscribers wherein the telecommunication signal path between the wireline and wireless subscribers is switched only by the integrated wireless and wireline telecommunication switch.

3. In an integrated wireless and wireline telecommunication switch connected to an integrated public switched telephone network (PSTN) trunk, a method of establishing a call between wireless and wireline subscribers through the switch wherein both the wireless subscriber and the integrated PSTN trunk are served by the switch, the method comprising the steps of:

receiving an origination message from the wireless subscriber;

sending a first initial address message to a first wireline subscriber through the integrated PSTN trunk;

receiving a first alerting message through the integrated PSTN trunk;

sending a first audible alerting message to the wireless subscriber;

receiving a first answer message for the first wireline subscriber through the integrated PSTN trunk;

completing a first connection to the first wireline subscriber when the first wireline subscriber answers; and completing a first telecommunication signal path between the wireless and wireline subscribers through the integrated wireless and wireline telecommunication switch and the integrated PSTN trunk.

4. The method of claim 3 further comprising the steps of:

receiving an off-hook notification message and called number digits from a second wireline subscriber, the second wireline subscriber connected to the switch via a direct signal path;

sending a second initial address message to a third wireline subscriber through the integrated PSTN trunk;

receiving a second alerting message through the integrated PSTN trunk;

sending a second audible alerting message to the second wireline subscriber;

completing a second connection to the third wireline subscriber through the integrated PSTN trunk when the third wireline subscriber answers; and completing a second telecommunication signal path between the second wireline subscriber and the third wireline subscriber through the integrated wireless and wireline switch and the integrated PSTN trunk, thereby switching simultaneous wireless and wireline calls through the integrated PSTN trunk.

5. A computer program product for causing an integrated wireless and wireline telecommunication switch to establish calls between wireless and wireline subscribers, the computer program product having a medium with a computer program embodied thereon, the computer program comprising:

computer program code for receiving origination messages from wireless subscribers;

computer program code for sending set-up requests to wireline subscribers;

computer program code fore sending alerting messages to wireless and wireline subscribers;

computer program code for receiving off-hook notification messages and called digits from wireline subscribers;

computer program code for accessing location information in a home location register; and computer program code for completing telecommunication signal paths between the wireless and wireline subscribers wherein the telecommunication signal paths between the wireless and wireline subscribers are switched only by the integrated wireless and wireline switch.

6. The computer program product of claim 5 wherein the computer program further comprises computer program code for completing telecommunication signal paths between wireless and wireline subscribers through the integrated wireless and wireline telecommunication switch and an integrated PSTN trunk.

7. Apparatus for establishing calls between wireless and wireline subscribers comprising:

means for receiving origination messages from wireless subscribers;

means for sending set-up requests to wireline subscribers;

means for sending alerting messages to wireless and wireline subscribers;

means for receiving off-hook notification messages and called digits from wireline subscribers;

means for accessing location information in a home location register for wireless subscribers; and means for completing telecommunication signal paths between the wireless and wireline subscribers wherein the telecommunication signal paths between the wireless and wireline subscribers are switched only by the apparatus.

8. The apparatus of claim 7 further comprising means for completing telecommunication signal paths between wireless and wireline subscribers through the apparatus and an integrated PSTN trunk.

* * * * *